Figure 1:
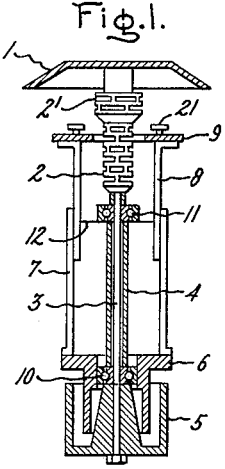

Inventor:
Norman C. Cordingly,
by Richard E. Hasley
His Attorney.

Patented May 25, 1954

2,679,608

UNITED STATES PATENT OFFICE 2,679,608

ANODE ASSEMBLY FOR X-RAY TUBES

Norman C. Cordingly, Arkley, England, assignor to General Electric Company, a corporation of New York Application February 4, 1952, Serial No. 269,771

Claims priority, application Great Britain February 13, 1951

3 Claims. (Cl. 313—60)

My invention relates to improvements in the anode assembly for X-ray tubes of the type having a rotating anode.

By rotating the anode of an X-ray tube while it is operating, it is possible to spread the heat developed by electron bombardment over a greater area of the anode, and hence a greater X-ray output can be obtained without damage to the anode, as is well known. The anode reaches a high temperature, but it is necessary to maintain the bearings in which the anode rotates at a lower temperature; hence it is desirable to enable the heat to be radiated outward as easily as possible and to prevent it reaching the bearings. If the temperature of the bearings rises to a high value, seizure of the bearings may occur due to thermal expansion, or the bearing lubricant may be destroyed.

The principal object of my invention is to provide an improved anode assembly for X-ray tubes which satisfies these requirements. Other objects and advantages will become apparent as the description proceeds.

Briefly stated, my improved anode assembly for an X-ray tube of the rotating anode type comprises a rotatable anode which is connected through a heat-resistive member to one end of a torque-transmitting member, the further end of which is connected to a driving rotor, and in which the rotating parts are mounted in a supporting structure by ball bearings, or the like, located substantially at respective ends of the torque member. The bearing which is nearest the anode is resiliently mounted on the supporting structure by a mechanical connection, preferably having relatively low heat conductivity, which permits this bearing to have a small amount of axial movement upon thermal expansion of the torque-transmitting member.

Preferably the supporting structure is of an open work or lattice type, and may, for example, comprise rods extending axially between annular end members. The bearings may be ball bearings or the like, such as roller bearings or needle bearings.

Preferably the heat-resistive member by which the anode is connected to the torque member comprises a tube which has laterally extending slots staggered so that the intervening metal provides a relatively long path for the heat flow between the anode and the torque member.

My invention will be better understood from the following description taken in connection with the accompanying drawing, and its scope will be pointed out in the appended claims.

Figure 2:
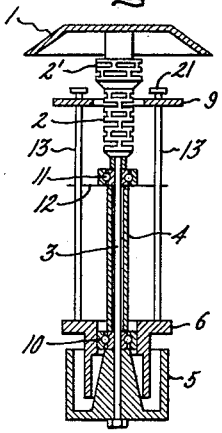
Figures 3, 4:
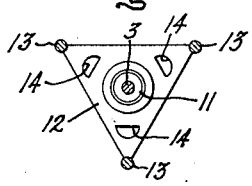
Figure 5:
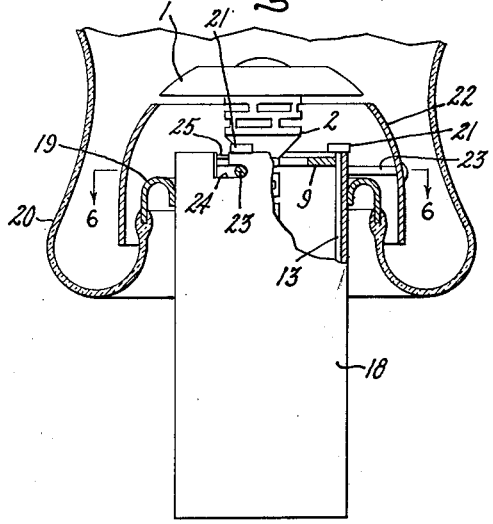
Figure 6:
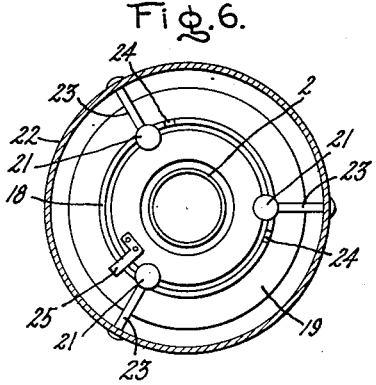

In the drawing,

Figs. 1 and 2 are schematic views which respectively show two forms of my improved anode structure, Figs. 3 and 4 are detailed views which respectively show two forms of the resilient connecting member, Fig. 5 is a view, partly in section, which shows a complete anode assembly, and Fig. 6 is a section view taken along the line 6—6 of Fig. 5.

Referring now to Fig. 1, a rotatable anode 1 is secured to one end of a heat-resistive member 2, the other end of which is secured to a torque transmitting member, or shaft 3, the further end of which is joined to a driving rotor 5. The shaft 3 preferably is surrounded by a sleeve 4. Member 2 may be tubular, and may have laterally extending staggered slots 2', to provide a relatively long path for heat flow. The driving rotor 5 is part of a small induction motor which rotates the anode in a manner well known in the art. A supporting structure comprises an annular end member 6 which also forms a magnetic flux ring for the motor. The end member 6 carries a cylindrical container 7 on which are mounted supporting brackets 8 which in turn carry a second annular end member 9.

The torque-transmitting member 3 is mounted in a ball bearing 10 substantially at its motor end, and in a ball bearing 11 substantially at its anode end. Bearing 10 is connected directly to end member 6 of the supporting structure, as shown. A spring plate 12 connects bearing 11 to the supporting structure. The plate 12 is sufficiently thin to have low heat conductivity, and is resilient to small axial movements of bearing 11 to permit thermal expansion of shaft 3. However, the spring plate prevents any substantial radial movement of bearing 11, and thus maintains shaft 3 in proper alignment.

Fig. 2 shows a preferred alternative arrangement in which the cylinder 7 and support brackets 8 are replaced by longitudinal rods 13 which extend between the annular end members 6 and 9. This construction has the added advantage that radiation of heat from the shaft 3 is freely permitted. In the preferred arrangement, there are three rods 13 spaced apart at equal intervals, but clearly additional rods may be employed, or alternatively a lattice or any other open work structure may be employed.

Fig. 3 shows the spring member 12 supporting the ball bearing 11 in greater detail. In this case it will be observed that the spring member 12 consists of a triangular plate mounted at its corners on the three longitudinal rods 13. Slots 14 are cut to enhance the resilience of the member. Alternatively, the plate may be replaced by three separate spring arms.

Fig. 4 shows an alternative arrangement for mounting the ball bearing 11. A substantially rigid plate 15 is employed, which is slidable along a portion 16 of the rod 13 which is of reduced section. Plate 15 is resiliently biased downwardly by means of a spring 17. In this arrangement, the plate may be of annular shape with prongs projecting outwardly to each of the rods 13. Alternatively, there may be separate arms connecting the ball bearing, or a supporting casing around the bearing, with each of the rods 13.

In the general assembly view of Fig. 5, a construction of the type shown in Fig. 2 is mounted in a fluid-cooled vacuum container 18, which may be either liquid or gas cooled. This container in turn is connected to a sealing member 19 attached to the envelope 20 of an X-ray tube, this method of sealing being well known.

For purposes of locating the anode assembly in the container 18, the rods 13 are each provided at the anode end with an enlarged head 21 which extends radially outward a sufficient distance to overlie the edge of container 18, as shown.

As shown in Figs. 5 and 6, the rods 13 are connected rigidly to an outer electrical stress guard 22 by radial rods 23; in the preferred arrangement shown, there are three of these rods.

The anode assembly is inserted in the container 18 by inserting the rods 23 into bayonet slots 24 in the edge of the container 18 and then giving the assembly a slight twist so that a spring finger 25 falls into one of the bayonet slots. This spring finger is rigidly mounted on the top end member 9 so that the whole assembly is thereby locked in the container 18 and can only be removed by lifting the spring finger 25.

It will be appreciated that such a construction enables the vacuum container 18 first to be sealed to the envelope 20, and then the anode assembly may be readily placed in position in the container 18 and locked in the manner described, the anode assembly being pushed down through the interior of the envelope 20 from the cathode end. This step in assembly, of course, occurs before the cathode assembly has been placed in position.

What I claim as new and desire to secure by Letters Patent of the United States is:

1. An anode assembly for an X-ray tube of the rotating anode type, comprising a rotatable anode, a driving rotor, a torque-transmitting shaft connected to said rotor, a heat-resistive member connected between said anode and said torque transmitting shaft, a supporting structure, bearings substantially at the rotor and anode ends respectively of said torque-transmitting shaft, the bearing at the rotor end being supported directly by said supporting structure, and a sheet metal connecting member of low heat conductivity between the bearing at the anode end and said supporting structure which prevents substantial radial movement of such bearing, said connecting member being resilient to axial movement of said bearing, thereby permitting thermal expansion of said torque-transmitting member.

2. An assembly as in claim 1, in which the supporting structure is of an open work construction to permit free radiation of heat from the heat-resistive and torque-transmitting members.

3. An assembly as in claim 2, in which the supporting structure comprises two annular end members and a plurality of rods extending axially between said end members.

References Cited in the file of this patent

UNITED STATES PATENTS

| Number | Name | Date |
|---|---|---|
| 2,121,632 | Gross et al. | June 21, 1938 |
| 2,450,530 | Sussin | Oct. 5, 1948 |
| 2,549,614 | Leighton | Apr. 17, 1951 |